Nov. 1, 1932.　　　H. H. BENN　　　1,885,321
PIPE COUPLING
Filed May 15, 1930
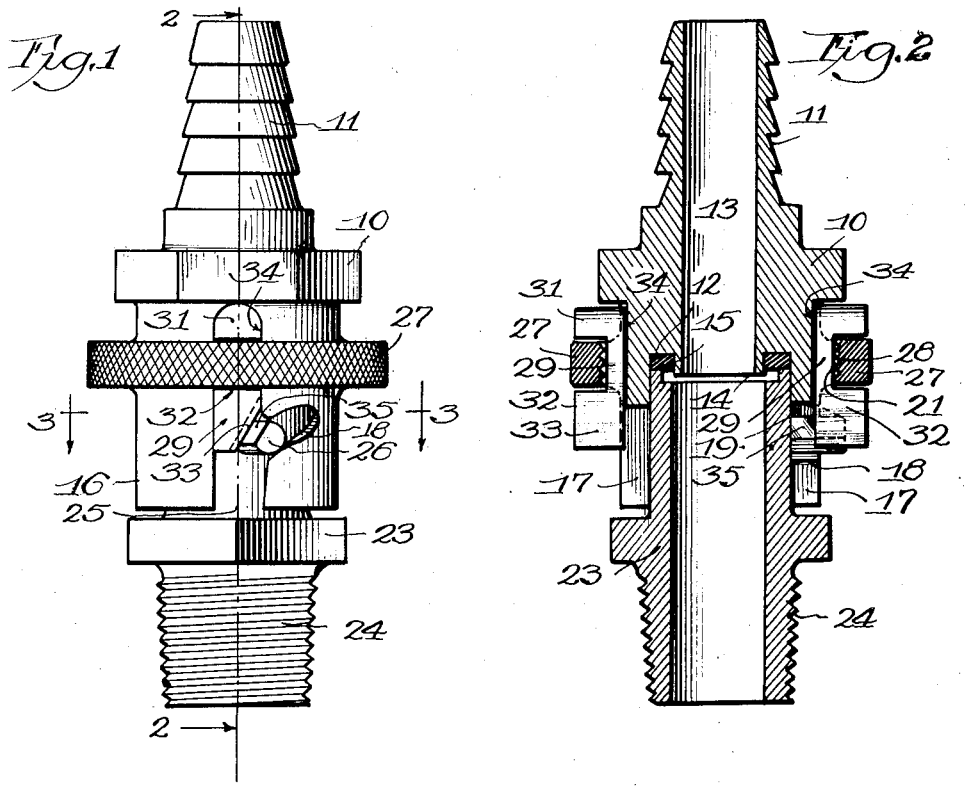
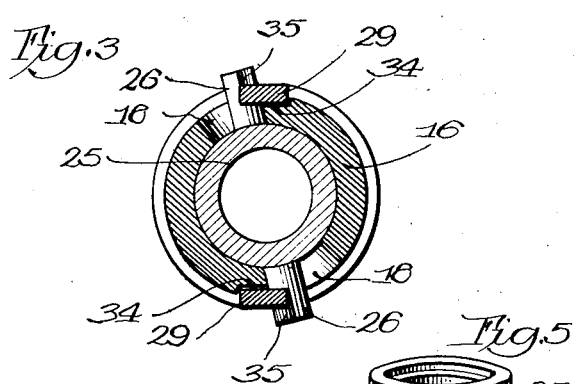
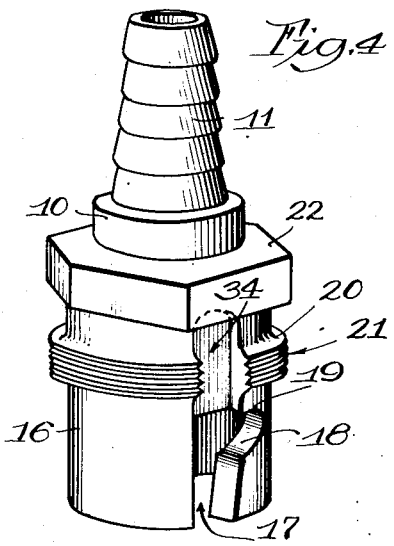
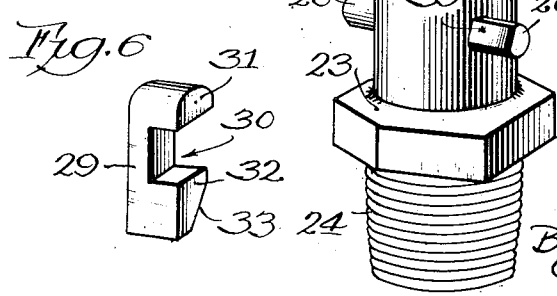
Inventor,
Howard H. Benn Patented Nov. 1, 1932

1,885,321

UNITED STATES PATENT OFFICE

HOWARD H. BENN, OF JACKSON, MICHIGAN, ASSIGNOR TO F. L. PARSONS, OF DETROIT, MICHIGAN

PIPE COUPLING

Application filed May 15, 1930. Serial No. 452,572.

This invention relates to improvements in pipe couplings particularly adapted, though not necessarily limited in its use with hose pipes, and one of the objects of the invention is to provide an improved coupling of this character which will be quick in operation and which will at the same time produce a tight joint.

A further object is to provide a coupling of this character having improved means for holding or protecting a gasket or packing and prevent the same from being blown out of position in the coupling, and improved means whereby the parts of the coupling may be adjusted to compensate the varying thicknesses of the gaskets or packing, and to take up the wear of the metal seats, thereby at all times maintaining an absolutely tight joint.

A further object is to provide improved locking means for maintaining the parts against accidental displacement.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a side elevation of a coupling of this character constructed in accordance with the principles of this invention.

Figure 2 is a longitudinal sectional view taken on line 2—2, Figure 1.

Figure 3 is a detail sectional view taken on line 3—3, Figure 1.

Figure 4 is a detail perspective view of one of the coupling members.

Figure 5 is a perspective view of the other coupling member.

Figure 6 is a detail perspective view of one of the locking elements.

Referring more particularly to the drawing the numeral 10 designates one of the coupling members which is provided with a portion 11 to which a hose pipe may be connected.

Within the member 10 and intermediate the ends thereof is a circumferential shoulder 12 which encompasses the opening 13 and which is spaced from the extremity 14 of the member 10. Within the recess formed by the shoulder 12 is arranged a gasket or packing 15, which is of any desired thickness.

The gasket is preferably of a thickness slightly less than the depth of the recess formed by the shoulder 12 so that it will be protected from the action of the substances passing through the coupling, and furthermore, the gasket will not be washed or blown out when the coupling members are disconnected.

Extending through the end 16 of the coupling member are bayonet slots 17, portions of which slots are so arranged that the walls 18 and 19 thereof will be on an incline, for a purpose to be hereinafter set forth, and the member 10 is provided with a portion 20 encompassing the same and of a diameter slightly larger than the diameter of the portion 16, and in the periphery of which portion 20 is arranged threads 21.

The member 16 may also be provided with a portion 22 which is angular in cross section and adapted to receive a tool to facilitate in the handling of the member 10.

Co-operating with the member 10 is another coupling member designated generally by the reference numeral 23, one extremity 24 of which is preferably corrugated or otherwise suitably shaped for the reception of the end of a hose pipe.

The other end 25 of the member 23 is of an external diameter slightly less than the internal diameter of the portion 16 of the member 10 and is provided with laterally projecting lugs 26, one for each of the bayonet slots 17, and these lugs are adapted to enter the respective slots so that the lugs, when one of the members is rotated with respect to the other and the lugs are adjacent the inclined walls 18, will engage the walls 18 of the slot and as they move thereacross they will draw the two coupling members together and will lock them against separation.

The extremity of the portion 25 of the member 23 is adapted to abut the gasket or packing 15 and by reason of the inclined walls 18 of the bayonet slots, the end of the member 23 will be forced against the gasket 15 to compress the same between the shoulder 12 and the end of the member 23.

By reason of the inclined walls 18 the member 23 is adapted to compensate for the varying thicknesses of gaskets and will also operate to take up the wear of the gasket.

The extremity 14 of the member 10 which projects beyond the shoulder 12 and which encompasses the opening 13 serves as a means for protecting the gasket and for preventing the same from becoming displaced when the members are disconnected, and also serves as a means for properly positioning the gasket with respect to the member 10.

With this improved construction it will be manifest that the two members may be readily and quickly coupled together and as quickly uncoupled, and at the same time there will be insured a fluid tight joint between the members at all times.

When the metallic seats or the gasket wears, it is only necessary to impart a slight relative rotation to the members 10 and 23, one with respect to the other.

In order to lock the parts against separation a locking device is provided and this locking device preferably comprises a sleeve or collar 27 having internal screw threads 28 adapted to engage the threads 21 on the member 16.

Locking elements 29 co-operate with the collar 27 and are provided with cut away portions 30 to engage over the inner peripheral edge of the collar 27. The cut away portion 30 forms a shoulder 21 on one side thereof and a shoulder 32 on the other side thereof which respectively extend over the proximate faces of the collar 27.

The locking members 29 are of a length greater than the thickness of the collar 27 so as to project therebeyond, and one face of the locking elements 29 is preferably inclined or beveled as at 33.

The member 10 is provided in the portion 16 with grooves or recesses 34 arranged in alinement with the entrance to the bayonet slot 17 and intersecting the threads 21.

The locking members 29 are adapted to be seated and move within the recesses or grooves 34 and will be held in position by the collar 27 engaging the threads 21.

When the collar is thus placed in position the locking members will be held against displacement by reason of the edge of the locking members engaging over one end of the collar 27 and the shoulder 32 engaging over the opposite edge of the collar.

The locking members are preferably of a size and are so positioned that they will enter the connecting portion of the bayonet slot 17.

When the coupling members are connected and the lugs 22 are moved into engagement with the inclined walls 18 of the bayonet slot, the locking members 29 may be adjusted by adjustment of the collar 27 upon the threads 21, causing the locking members to enter the bayonet slot and the beveled surfaces 33 thereof to engage behind the respective lugs 26 on the portion 25 of the member 23 and thereby prevent the members 10 and 23 from being rotated one with respect to the other.

The beveled surfaces 33 on the locking members 29 also serve as a means for forcing the lugs 26 over the inclined walls 18 of the bayonet slot and a portion of the lugs 26 with which the inclined surfaces 33 contact are preferably flat as at 35.

In assembling this coupling, the collar 27 with the locking members 29 connected therewith is placed upon the extremity of the member 10 and the collar is retracted sufficiently so that the locking members 29 will pass out of the openings of the bayonet slot 17 in the portion 16 of the member 10. The end 25 of the member 23 is then telescoped with the end of the portion 16 of the member 10, causing the lugs 26 to enter the bayonet slots 17 until the lugs are in a position that when the members 10 and 23 are rotated with respect to each other the lugs 26 will engage the inclined walls 18 of the bayonet slots. After the members have been thus connected the collar 27 is then advanced by screwing the same forwardly upon the portion 16 of the member 10 a sufficient distance that the extremity of the locking members 29 will enter the bayonet slots to cause the inclined surfaces 33 to engage the surfaces 35 of the lugs 26. The lugs 26 entering the grooves 34 in the threads 21 of the member 10 serves as a means for guiding the locking members.

With this improved construction it will be manifest that there will be provided a pipe coupling which will not only provide a fluid tight joint at all times, but means are also provided whereby a wear of the parts may be taken up and such wear compensated, without the necessity of separating the coupling members to replace a partially worn gasket or packing.

The locking members 29 serve to prevent the parts from becoming accidentally disengaged.

It will also be manifest that with the arrangement and the protection of the gasket or packing 15, the latter will be held at all times in its seat and cannot become disengaged or blown out by the fluid passing through the coupling when the coupling members are partially or entirely separated.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A coupling embodying two members one of which telescopes with the other, there being a bayonet slot opening through the end of one of the members, a lug carried by the other member and adapted to enter the said slot, means for locking the lug in the slot, the portion of the wall of the slot with which the lug contacts being inclined, the said locking means operating upon the lug to force the same upon the said inclined portion, and means operating directly upon the said locking means for positively advancing and retracting the same.

2. A coupling embodying two members one of which telescopes with the other, there being a bayonet slot in one of the members opening through the end thereof, a lug carried by the other member and adapted to enter the slot, a locking element for locking the lug in the slot, the face of said element which engages the lug being inclined, and means adjustably connecting said element with one of the said members, the said means operating to positively advance and retract the said locking element.

3. A coupling embodying two members one of which telescopes with the other, there being a bayonet slot in one of the members opening through the end thereof, a lug carried by the other member and adapted to enter the slot, a locking element for locking the lug in the slot, and means connecting said element with one of the said members for adjustment lengthwise thereof, the said means positively operating upon the locking element to force it between the said lug and one wall of the slot and being also operable to positively withdraw the locking element, the said means also operating to force the said lug into the said slot.

4. A coupling embodying two members one of which telescopes with the other, there being a bayonet slot in one of the members opening through the end thereof, a lug carried by the other member and adapted to enter the slot, a locking element for locking the lug in the slot, a collar connected with one of the elements for adjustment lengthwise thereof, and means connecting the said locking element with the collar to be positively shifted thereby in either direction of movement of the collar.

5. A coupling embodying two members one of which telescopes with the other, there being a bayonet slot in one of the members opening through the end thereof, a lug carried by the other member and adapted to enter the slot, a locking element for locking the lug in the slot, a collar adjustably connected with one of the members, and means connecting the said locking element with the collar to be shifted thereby, the said collar being movable with and with respect to the said locking element.

6. A coupling embodying two members one of which telescopes with the other, there being a bayonet slot in one of the members opening through the end thereof, a lug carried by the other member and adapted to enter the slot, a locking element for locking the lug in the slot, a collar adjustably connected with one of the elements, means connecting the collar with the locking means for movement therewith and with respect thereto, and interengaging means between the said locking element and one of the said members for guiding the locking means in its movement.

7. A coupling embodying two members one of which telescopes with the other, there being a bayonet slot in one of the members opening through the end thereof, a lug carried by the other member and adapted to enter the slot through the open end thereof, a locking element for locking the lug in the slot, a collar adjustably connected with one of the members, and means connecting the said locking element with the collar for movement therewith and with respect thereto, said element being movable into engagement with said lug, the face of the said element which engages the said lug being inclined.

In testimony whereof I have signed my name to this specification on this 10th day of May, A. D. 1930.

HOWARD H. BENN.